UNITED STATES PATENT OFFICE.

GEBHARD RAEDLER AND JOHN MARAZZI, OF CINCINNATI, OHIO.

IMPROVEMENT IN ARTIFICIAL STONE.

Specification forming part of Letters Patent No. 222,532, dated December 9, 1879; application filed September 17, 1879.

*To all whom it may concern:*

Be it known that we, GEBHARD RAEDLER and JOHN MARAZZI, of Cincinnati, in the county of Hamilton and State of Ohio, have invented a new and useful Improvement in Artificial Stone, of which the following is a specification.

Our invention relates to the production of an artificial stone for building, paving, and other similar purposes.

The invention has for its object to produce a harder and more durable artificial stone than any now in use.

The following are the ingredients employed in making the stone, with their proportions: twelve (12) parts of English Portland cement; three (3) parts of washed sand; one (1) part of a suitable coloring-matter.

The composition is prepared in the following manner: The cement and sand are placed in a large iron kettle; three parts of boiling-water are then added, and the composition is then heated to about 230° Fahrenheit, and kept at about that temperature for eight or ten minutes; then it is put into the molds. The molds are not heated for the reception of the composition. The composition is continually stirred while subjected to the heat, and the coloring-matter is added immediately before molding.

The important feature in this process is the use of heat, as set forth, as the same composition, if molded without heating, gives an entirely different product, not nearly so hard and durable as when subjected to the heat.

The composition can be molded into any desired form or size of block or slab. After molding, the blocks can be used after being soaked in water for twenty-four hours and then dried for four weeks.

Having thus described our invention, we claim as new and desire to secure by Letters Patent—

In the process of making artificial stone, a sub-process that consists in exposing the mixture of sand, cement, and water to a temperature of about 230° Fahrenheit for about eight or ten minutes while kept in motion by stirring, as described.

GEBHARD RAEDLER.
JOHN MARAZZI.

Witnesses:
GEORGE C. SEEGER,
EMIL G. ROTHE.